United States Patent [19]

Webb, Jr.

[11] Patent Number: 4,557,201
[45] Date of Patent: Dec. 10, 1985

[54] APPARATUS FOR STORAGE AND TRANSPORTATION OF JEWELRY DISPLAY TRAYS

[75] Inventor: James V. Webb, Jr., Carrollton, Tex.
[73] Assignee: Jeweler's Safe Company, Inc., Carrollton, Tex.
[21] Appl. No.: 551,178
[22] Filed: Nov. 14, 1983
[51] Int. Cl.$^4$ .............................................. E05G 1/00
[52] U.S. Cl. ........................................ 109/45; 109/53; 280/79.1 A
[58] Field of Search ....................... 109/22, 45, 49, 57, 109/56, 54, 53, 47, 46; 211/126; 414/278; 206/566; 280/79.1 R, 79.1 A

[56] References Cited

U.S. PATENT DOCUMENTS

| 159,380 | 2/1875 | Barnes | 109/56 |
| 851,711 | 4/1907 | Tory | 109/45 |
| 2,652,308 | 9/1953 | Peterson | 280/79.1 |
| 3,332,730 | 7/1967 | Rubin et al. | 211/126 |
| 3,837,300 | 9/1974 | Karr | 109/53 |
| 3,902,603 | 9/1975 | Wilson | 211/126 |
| 3,970,010 | 7/1976 | Cautley | 109/56 |

Primary Examiner—John J. Wilson
Assistant Examiner—John G. Weiss
Attorney, Agent, or Firm—Hubbard, Thurman, Turner & Tucker

[57] ABSTRACT

An apparatus is disclosed for storage and transportation of jewelry display trays which includes a high security lockable safe with an interior cavity suitable for receiving a rectangular storage rack. The storage rack includes a plurality of slots for receiving and engageably restraining standard jewelry display trays and is equipped with recessed casters which permit the storage rack to be rolled into and out of the safe. A wheeled transport table is provided which includes an upper surface adapted to support the storage rack and which is designed to permit one edge of that upper surface to be placed in mated relationship with the interior cavity of the safe. The storage rack may then be rolled onto the transport table and locked in place for transport utilizing retainer pins.

16 Claims, 4 Drawing Figures

APPARATUS FOR STORAGE AND TRANSPORTATION OF JEWELRY DISPLAY TRAYS

BACKGROUND OF THE INVENTION

This invention relates in general to safes and vaults and in particular to jewelry safes and vaults. Still more particularly, this invention relates to jewelry safes which include provision for the transportation of a plurality of jewelry display trays.

Safes and vaults are well known in the prior art and are utilized quite commonly in the jewelry trade. The high monetary value of certain precious stones and metals makes it absolutely necessary that a jeweler possess some secure storage facility to protect his merchandise.

Quite often, the entire stock in an average jewelry store is on display during business hours, artistically arranged on jewelry display trays covered in velvet or other materials. It is the transportation of these trays to and from his safe that represents the single greatest security threat to a jeweler. While utilizing well known jewelry safes or vaults, both the safe and the display case must remain open for long periods of time while individual trays are carried to and from the safe, exposing this valuable merchandise to unacceptable risk.

It should therefore be apparent that there exists a need for a storage and transportation system which minimizes this risk and permits highly efficient secure storage and transportation of a plurality of jewelry display trays.

SUMMARY OF THE INVENTION

It is therefore one object of the present invention to provide an improved jewelry storage system.

It is another object of the present invention to provide an improved apparatus for the transportation of jewelry display trays.

It is yet another object of the present invention to provide an improved apparatus for the transportation of jewelry display trays which permits rapid storage of a plurality of display trays.

It is another object of the present invention to provide an improved apparatus for the transportation and storage of jewelry display trays which minimizes the amount of time during which the storage facility must be open.

The foregoing objects are achieved as is now described. A high security lockable safe with an interior cavity suitable for receiving a rectangular storage rack is provided. The storage rack includes a plurality of slots for receiving and engageably restraining standard jewelry display trays and is equipped with recessed casters which permit the storage rack to be rolled into and out of the safe. A wheeled transport table is provided which includes an upper surface adapted to support the storage rack and which is designed to permit one edge of that upper surface to be placed in mated relationship with the interior cavity of the safe. The storage rack may then be rolled onto the transport table and locked in place for transport utilizing retainer pins.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
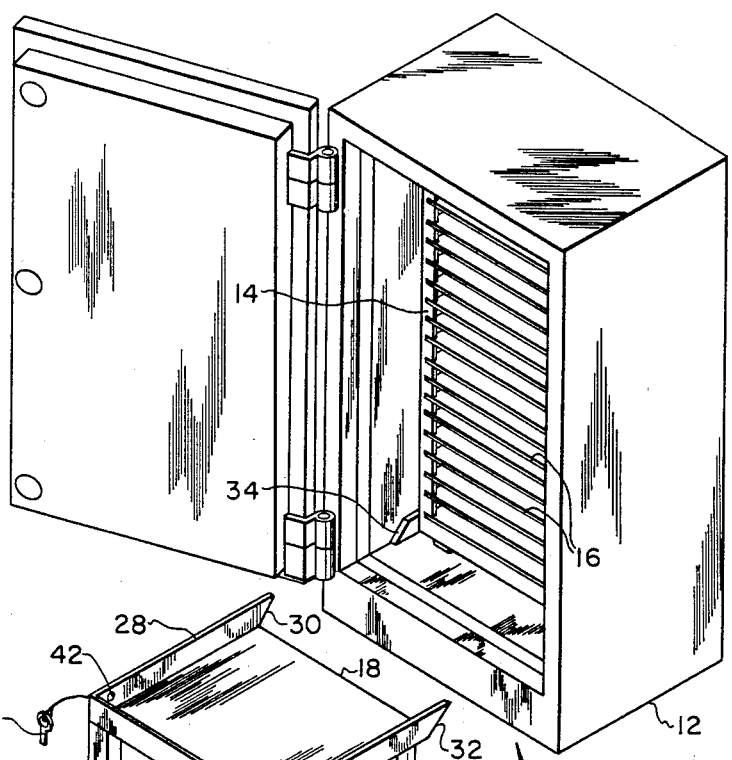
FIG. 1 is a perspective view of the novel storage and transport apparatus of the present invention.

With reference now to the figures and in particular with reference to FIG. 1, there is depicted a perspective view of novel storage and transport apparatus 10 of the present invention. As can be seen, apparatus 10 includes a vault 12 which is constructed to provide a high security lockable safe. As those skilled in the art will appreciate, vault 12 is typically constructed utilizing a combination of common and exotic metals, and is designed to hamper any attempt at opening vault 12 without the proper combination or key.

Disposed within vault 12 is storage rack 14. Storage rack 14 is preferably constructed utilizing a rigid and reasonably strong material such as extruded aluminum and includes provision for receiving and engageably restraining a plurality of jewelry display trays 16. While a single storage rack 14 is depicted in FIG. 1, those skilled in this art will appreciate that the interior cavity of vault 12 may be enlarged to receive a plurality of such storage racks if so desired.

Also provided with apparatus 10 is a wheeled transport table 18. As can be seen, transport table 18 includes a plurality of support legs 20, 22, 24 and 26 (not shown), each of which includes an ordinary wheel or caster. Again, transport table 18 is preferably constructed utilizing aluminum or similar materials and includes a lip 28 which entends around the periphery of the upper surface of transport table 18 on three sides thereof. One novel feature of apparatus 10 includes structural extensions 30 and 32 which extend from transport table 18 and which can be utilized to align transport table 18 with respect to the interior cavity of vault 12 by mating structural extensions 30 and 32 with structural members 34 and 36 (not shown) within vault 12. Also included on transport table 18 are retaining pins 38 and 40 which are adapted to be inserted into apertures 40 and 42 in lip 28 in a manner which will be explained further herein.

Figure 2:
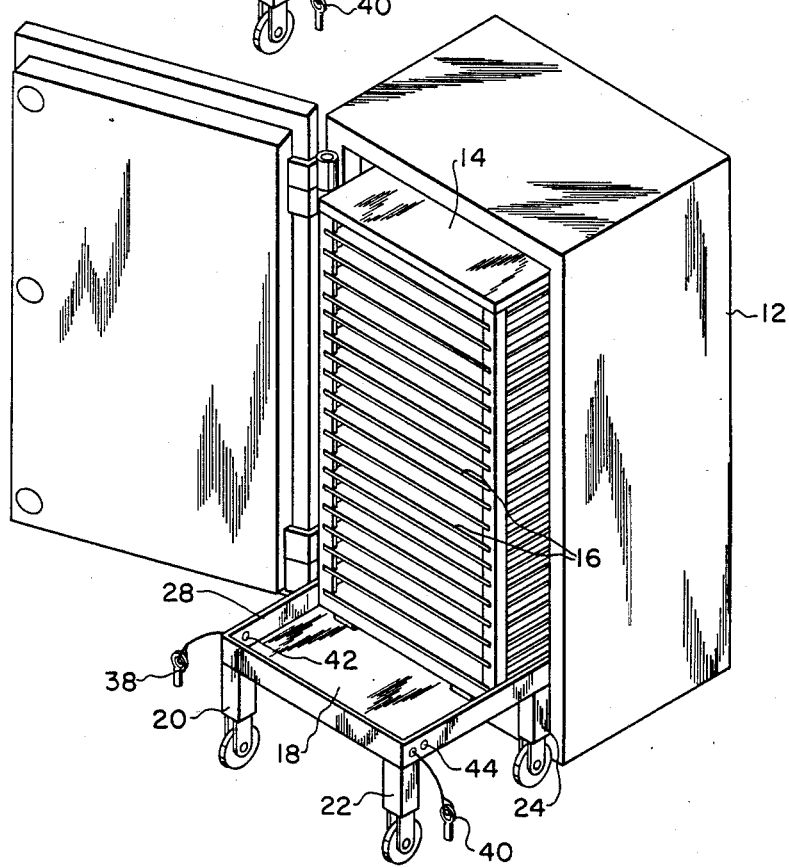
FIG. 2 is a perspective view of the novel storage and transport apparatus of the present invention depicting the transport table engaged with the storage vault.

Referring now to FIG. 2, there is depicted a perspective view of the novel storage and transport apparatus of the present invention which depicts transport table 18 engaged with the interior cavity of vault 12. As can be seen in FIG. 2, when structural extensions 30 and 32 are mated with structural members 34 and 36, storage rack 14 may be removed from the interior of vault 12 and placed upon the upper surface of transport table 18. In a preferred mode of the present invention, storage rack 14 includes casters disposed in the bottom surface thereof which may be utilized to facilitate movement of storage rack 14 from the interior of vault 12 onto the upper surface of transport table 18 and from transport table 18 into the interior of vault 12.

Figure 3:
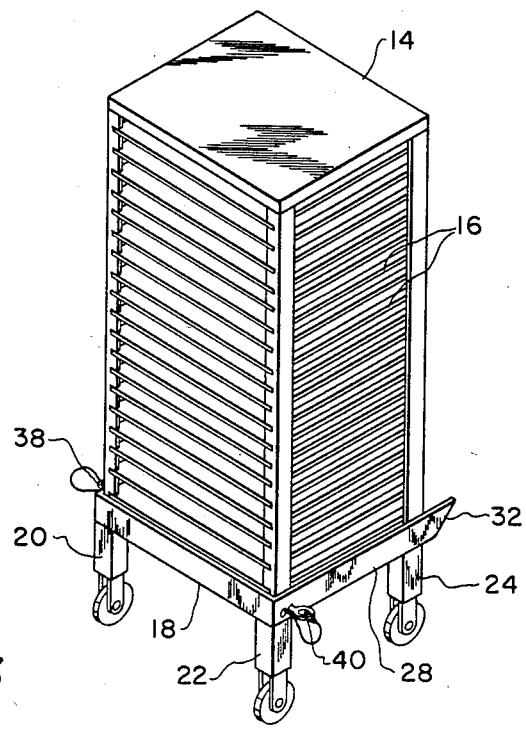
FIG. 3 is a perspective view of the storage rack of the novel storage and transport apparatus of the present invention, coupled to the transport table of the present invention.

Referring now to FIG. 3, there is depicted a perspective view of storage rack 14 of storage and transport apparatus 10 of the present invention, coupled to transport table 18 in the manner utilized to transport storage rack 14. As can be seen in this figure, retainer pins 38 and 40 have been inserted into apertures 42 and 44 of lip 28 and through a corresponding aperture in the bottom structural member of storage rack 14. In this manner, retainer pins 38 and 40 serve to restrain movement of storage rack 14 during transporting of storage rack 14 on transport table 18.

Figure 4:
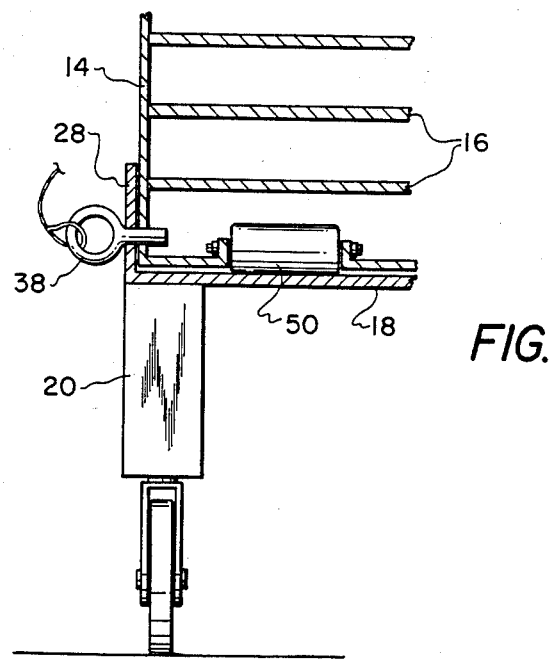
FIG. 4 is a partial sectional view of the coupling between the storage rack and transport table of the present invention.

Referring now to FIG. 4, there is depicted a partially sectional view of the coupling between storage rack 14 and transport table 18 of the present invention. As can be seen, retainer pin 38 is inserted through aperture 42 into a corresponding aperture in storage rack 14. In this manner, storage rack 14, which would otherwise be free to roll on caster 50, is restrained and may be freely wheeled to and from the jeweler's display cases while carrying all of the display trays, thus obviating the requirement that the vault and display cases both remain open for long periods of time.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. Apparatus for the storage and transportation of jewelry display trays comprising in combination:
    storage rack means having a plurality of apertures for receiving jewelry display trays;
    a closable vault having an interior cavity suitable for receiving said storage rack means;
    a structural member disposed within said interior cavity of said vault having at least one exposed edge;
    transport means having an upper surface suitable for supporting said storage rack means;
    a structural extension of said transport means having at least one exposed edge adapted to be mated with said structural member within said interior cavity of said vault wherein said transport means may be aligned in a selected position with respect to said interior cavity of said vault whereby said storage rack may be easily moved from said interior cavity to said transport means; and
    means for selectively coupling said storage rack means to the upper surface of said transport means wherein said storage rack means may be selectively transported by means of said transport means.

2. Apparatus for the storage and transportation of jewelry display trays according to claim 1 wherein said storage rack means comprises a rectangular rack constructed of aluminum.

3. Apparatus for the storage and transportation of jewelry display trays according to claim 1 wherein said vault comprises a high security lockable safe.

4. Apparatus for the storage and transportation of jewelry display trays according to claim 1 wherein said transport means comprises a multi-legged support platform having transport wheels disposed on each leg thereof.

5. Apparatus for the storage and transportation of jewelry display trays according to claim 4 wherein said multi-legged support platform comprises a rectangular platform having a lip on three sides thereof.

6. Apparatus for the storage and transportation of jewelry display trays according to claim 4 wherein said multi-legged support platform is constructed of aluminum.

7. Apparatus for the storage and transportation of jewelry display trays according to claim 4 wherein said multi-legged support platform comprises a four legged support platform.

8. Apparatus for the storage and transportation of jewelry display trays according to claim 5 wherein said means for selectively coupling said storage rack means to the upper surface of said transport means comprises at least one retainer pin adapted to be inserted through said lip and into a selected aperture within said storage rack means.

9. Apparatus for the storage and transportation of jewelry display trays comprising in combination:
    storage rack means having a plurality of apertures for receiving jewelry display trays and a plurality of castors disposed on the lower surface thereof for facilitating movement of said storage rack means;
    a closable vault having an interior cavity suitable for receiving said storage rack means;
    a structural member disposed within said interior cavity of said vault having at least one exposed edge;
    transport means having an upper surface suitable for supporting said storage rack means;
    a structural extension of said transport means having at least one exposed edge adapted to be mated with said structural member within said interior cavity of said vault wherein said transport means may be aligned in a selected position with respect to said interior cavity of said vault whereby said storage rack may be easily moved from said interior cavity to said transport means; and
    means for selectively coupling said storage rack means to the upper surface of said transport means wherein said storage rack means may be selectively transported by means of said transport means.

10. Apparatus for the storage and transportation of jewelry display trays according to claim 9 wherein said storage rack means comprises a rectangular rack constructed of aluminum.

11. Apparatus for the storage and transportation of jewelry display trays according to claim 9 wherein said vault comprises a high security lockable safe.

12. Apparatus for the storage and transportation of jewelry display trays according to claim 9 wherein said transport means comprises a multi-legged support platform having transport wheels disposed on each leg thereof.

13. Apparatus for the storage and transportation of jewelry display trays according to claim 12 wherein said multi-legged support platform comprises a rectangular platform having a lip on three sides thereof.

14. Apparatus for the storage and transportation of jewelry display trays according to claim 12 wherein said multi-legged support platform is constructed of aluminum.

15. Apparatus for the storage and transportation of jewelry display trays according to claim 12 wherein said multi-legged support platform comprises a four legged support platform.

16. Apparatus for the storage and transportation of jewelry display trays according to claim 13 wherein said means for selectively coupling said storage rack means to the upper surface of said transport means comprises at least one retainer pin adapted to be inserted through said lip and into a selected aperture within said storage rack means.

* * * * *